G. E. ROGERS.
MEANS FOR PREVENTING FRICTIONAL DRAG ON ROTATING SCREW HEADS.
APPLICATION FILED NOV. 30, 1909.
981,315.
Patented Jan. 10, 1911.
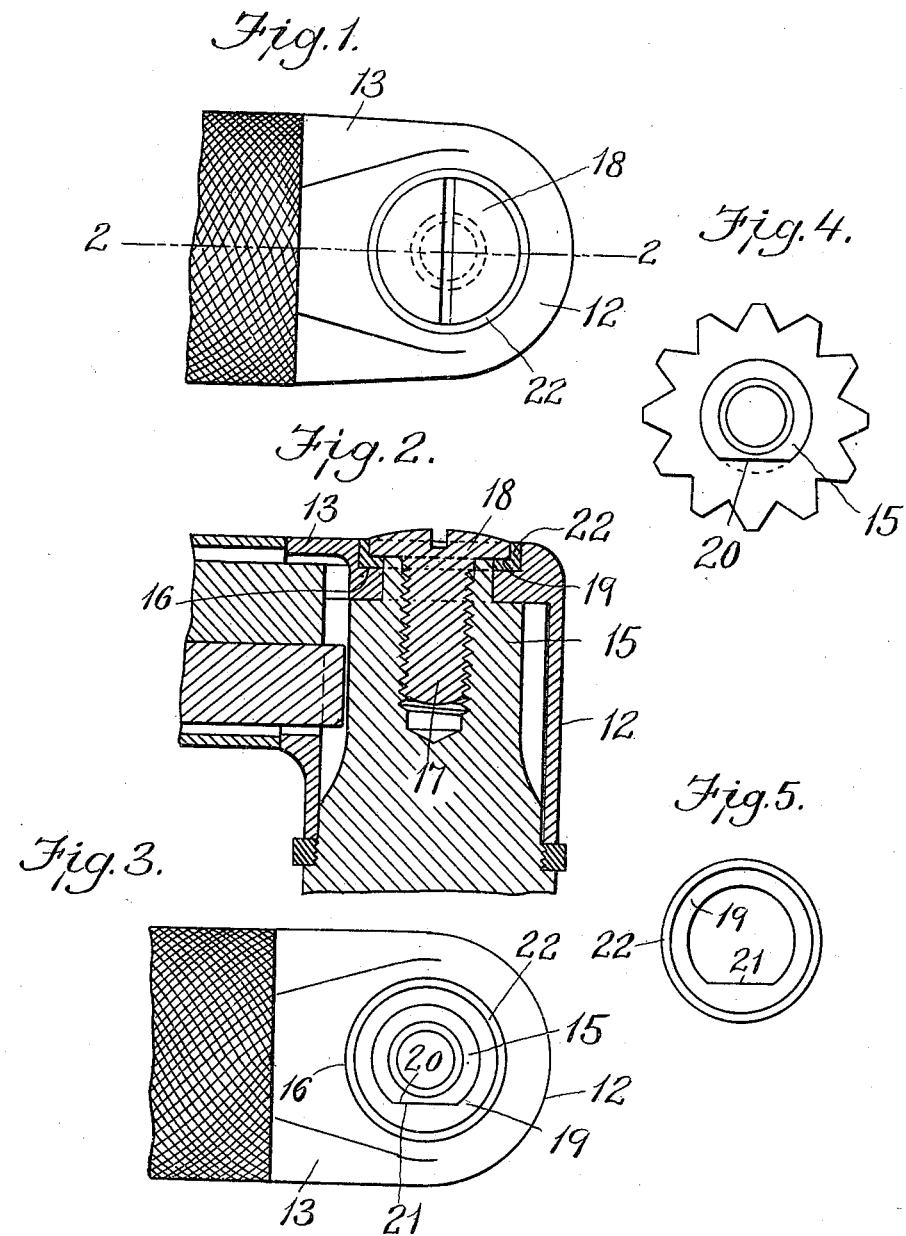
Witnesses:
Inventor:
George E. Rogers
by Knight Brown Quinby May
Attys.

UNITED STATES PATENT OFFICE.

GEORGE E. ROGERS, OF GREENFIELD, MASSACHUSETTS, ASSIGNOR TO MILLERS FALLS COMPANY, OF MILLERS FALLS, MASSACHUSETTS, A CORPORATION OF MASSACHUSETTS.

MEANS FOR PREVENTING FRICTIONAL DRAG ON ROTATING SCREW-HEADS.

981,315.

Specification of Letters Patent. Patented Jan. 10, 1911.

Application filed November 20, 1909. Serial No. 530,583.

*To all whom it may concern:*

Be it known that I, GEORGE E. ROGERS, of Greenfield, in the county of Franklin and State of Massachusetts, have invented certain new and useful Improvements in Means for Preventing Frictional Drag on Rotating Screw-Heads, of which the following is a specification.

This invention has for its object to prevent the accidental rotation and unscrewing of a screw which is engaged with a rotary body, the axis of rotation of the screw and of the body with which it is engaged being coincident, and the head of the screw projecting outwardly from said body.

The periphery of a projecting screw head, rotating about the longitudinal axis of the screw, is liable to experience a frictional drag from adjacent surfaces or objects, and to be accidentally turned in such manner as to loosen or partially withdraw the screw from the internally threaded socket with which it is engaged.

My invention consists in the improvements hereinafter described, whereby friction drag on the periphery of a rotating screw head is prevented.

Of the accompanying drawings forming a part of this specification,—Figure 1 represents an end view showing the head of a rotary screw; a part of the bearing in which the screw and the shank or body, hereinafter referred to, rotate; and the flange of the washer which prevents frictional drag on the periphery of the screw head in accordance with my invention. Fig. 2 represents a section on the line 2—2 of Fig. 1. Fig. 3 represents a view similar to Fig. 1, the screw being removed. Fig. 4 represents an end view of the shank or body with which the screw is engaged. Fig. 5 represents a side view of the flanged washer.

The same reference characters indicate the same parts wherever they occur.

The structure, of which the screw and the means for preventing frictional drag on its head form a part, as here illustrated, relates to the ratchet brace shown in Letters Patent of the United States, No. 935,266, dated September 28, 1909, this structure being selected by me for the purpose of illustrating my invention. 12 and 13 represent the outer and inner arms of the angular head of the said ratchet brace, the inner arm 13 being provided with the usual crank head handle or brace, while in the outer arm is journaled the shank 15 of a chuck adapted to grasp a bit or other tool, the shank being rotatable in a bearing in the outer arm 12, all as shown in the above-mentioned Letters Patent. The said angular head is provided at the outer end of the bearing with a circular recess 16 surrounding the bearing and of considerably greater diameter than the shank 15, the outer end of the shank projecting into said recess as shown in Fig. 2. The shank 15 is provided with a longitudinal internally threaded socket, the wall of which is concentric with the axis of the shank.

17 represents a screw adapted to engage the threaded socket in the shank 15 and provided with a head 18 having a flat under side, the diameter of the head exceeding the diameter of the shank 15, so that the head bears on and projects across the outer end of the shank, as shown in Fig. 2.

19 represents a washer which is interposed between the bottom of the recess 16 and the under side of the screw head. The washer and the shank are provided with complemental coupling members which cause the washer to rotate with the shank, said members, as here shown, comprising a flat face 20 formed on one side of the shank, and a flat face or chord 21 formed on the inner edge of the washer and adapted to bear on the face 20 as indicated in Fig. 3. When the screw 17 is turned to place, the marginal portion of its head overhanging the bottom of the recess 16, and the interposed washer 19 prevent the withdrawal of the shank 15 from the head. When the shank is rotated in the head, the screw and the washer rotate with it.

Heretofore the periphery of the screw head has been exposed to frictional contact with the margin of the recess 16, or, in case said recess is made of considerably greater diameter than the screw head, the periphery of the latter has been exposed to frictional contact with grit or other foreign matter which may lodge between the wall of the recess and the periphery of the screw head. In either case, the screw head, when rotating, is liable to be frictionally retarded, so that, when the rotation is in a given direction, the screw is liable to be accidentally turned backwardly and loosened. In the ratchet brace above referred to, provision is made for rotating the shank 15 and the chuck carried thereby in either direction, so that, although frictional drag on the periphery of the screw head while it is rotating in one direction will tend to tighten the screw, the same drag when the screw is rotating in the opposite direction will tend to loosen the screw. In practice, much difficulty has been experienced in the operation of the ratchet brace above referred to by reason of the liability of the screw to work loose. To obviate this objection and prevent any possibility of frictional drag on the periphery of the screw, I provide the washer 19 with an outwardly projecting annular flange 22, adapted to surround and closely fit the periphery of the screw head and cover the same so that it cannot come in contact with an external object. The described rotative engagement between the washer and the shank 15 insures the rotation of the flange 22 with the shank, washer and screw, the flange being interposed between the periphery of the screw head and the surrounding wall or margin of the recess 16, and the outer periphery of the flange being in close proximity to the said wall. It will be seen, therefore, that by the simple provision of the flange 22 on a washer which is so coupled to or engaged with the shank 15 as to rotate therewith, all liability of the accidental rotation and loosening of the connecting screw 17 is prevented.

My invention is not limited to the particular application of it here shown and described.

I claim:

1. As a means for preventing frictional drag on the periphery of the head of a screw which is engaged with a rotary body, said screw and body having a common axis of rotation, a washer engaged with the said body and having a seat for the inner side of the screw head, and a flange covering the periphery of said head, said washer and flange rotating with the body and screw, the flange being adapted to prevent frictional contact between the periphery of the screw head and an adjacent surface.

2. In combination, a rotary body having an internally threaded socket concentric with its axis, a bearing in which said body is journaled, a screw adapted to engage the socket and having a head of greater diameter than the rotary body, and a washer engaged with the said body to rotate therewith, and having a seat for the inner side of the screw head and a flange covering the periphery of the head, said washer and flange rotating with the body and screw.

3. In combination, a rotary body having an internally threaded socket concentric with its axis of rotation, a bearing in which said shank is journaled, the said bearing being provided with a screw-head-receiving cavity into which the outer end of the shank projects, a screw having a head located in said cavity and formed to engage said socket and bear on the projecting end of the shank, and a washer engaged with the projecting end of the shank to rotate therewith and provided with a flange surrounding the periphery of the screw head and rotating with it, the flange being interposed between the screw head and the surrounding wall of the cavity, and adapted to prevent a frictional drag on the periphery of the screw head tending to loosen the screw.

In testimony whereof I have affixed my signature, in presence of two witnesses.

GEORGE E. ROGERS.

Witnesses:
EARLE A. BROWN,
KATHERINE E. NICHOLS.